(12) United States Patent
Liu et al.

(10) Patent No.: US 11,767,979 B2
(45) Date of Patent: Sep. 26, 2023

(54) INJECTION MANIFOLD WITH TESLA VALVES FOR ROTATING DETONATION ENGINES

(71) Applicant: Purdue Research Foundation, West Lafayette, IN (US)

(72) Inventors: Qili Liu, West Lafayette, IN (US); Li Qiao, West Lafayette, IN (US)

(73) Assignee: Purdue Research Foundation, West Lafayette, IN (US)

(*) Notice: Subject to any disclaimer, the term of this patent is extended or adjusted under 35 U.S.C. 154(b) by 0 days.

(21) Appl. No.: 17/553,550

(22) Filed: Dec. 16, 2021

(65) Prior Publication Data
US 2022/0195963 A1 Jun. 23, 2022

Related U.S. Application Data

(60) Provisional application No. 63/126,987, filed on Dec. 17, 2020.

(51) Int. Cl.
*F23R 7/00* (2006.01)
*F02C 5/02* (2006.01)
(Continued)

(52) U.S. Cl.
CPC .............. *F23R 7/00* (2013.01); *F02C 5/02* (2013.01); *F02K 7/067* (2013.01); *F02K 9/52* (2013.01)

(58) Field of Classification Search
CPC ...... F23R 7/00; F02C 5/00; F02C 5/02; F02C 5/12; F02K 7/02; F02K 7/04; F02K 7/06;
(Continued)

(56) References Cited

U.S. PATENT DOCUMENTS 1,329,559 A * 2/1920 Tesla ........................ F15D 1/02
137/842
2,411,798 A * 11/1946 Matthews ................. F02C 5/02
60/39.77
(Continued)

FOREIGN PATENT DOCUMENTS

CN 113819491 A * 12/2021 ............... F02C 3/14
WO WO-2021146779 A1 * 7/2021

OTHER PUBLICATIONS

Truong et al., Simulation and Optimization of Tesla Valves, Nanotech 2003, vol. 1.
(Continued)

*Primary Examiner* — William H Rodriguez
(74) *Attorney, Agent, or Firm* — Piroozi-IP, LLC

(57) ABSTRACT

A rotating detonation engine (RDE) is disclosed which includes a housing, an injector assembly disposed within the housing, the injector assembly includes a fuel manifold, an oxidizer manifold, and a combustion chamber, fuel from the fuel manifold and an oxidizer from the oxidizer manifold are combined and combusted in the combustion chamber, each of the fuel and oxidizer manifolds communicates with the combustion chamber via a plurality of Tesla valves each via a corresponding port, wherein the plurality of Tesla valves substantially eliminate reverse flow of exhaust gases from the combustion chamber back to the fuel manifold or the oxidizer manifold.

18 Claims, 17 Drawing Sheets
(2 of 17 Drawing Sheet(s) Filed in Color)

(51) Int. Cl.
*F02K 7/067* (2006.01)
*F02K 9/52* (2006.01)

(58) Field of Classification Search
CPC ........ F02K 7/067; F04B 53/1077; F15C 3/16;
F15C 1/22; F16K 99/0021
USPC .................................. 417/323; 137/804–842
See application file for complete search history.

(56) References Cited

U.S. PATENT DOCUMENTS

| | | | | |
|---|---|---|---|---|
| 5,265,636 | A * | 11/1993 | Reed | F15C 1/146 |
| | | | | 137/833 |
| 9,915,362 | B2 * | 3/2018 | Hampton | F16K 99/0057 |
| 11,209,164 | B1 * | 12/2021 | Ryon | F23R 3/343 |
| 11,236,908 | B2 * | 2/2022 | Wickersham | F02C 3/16 |
| 2014/0151062 | A1 * | 6/2014 | Stephenson | E21B 43/12 |
| | | | | 166/162 |
| 2015/0059718 | A1 * | 3/2015 | Claywell | F01M 13/00 |
| | | | | 123/572 |
| 2018/0274439 | A1 * | 9/2018 | Holley | F23R 7/00 |
| 2018/0274442 | A1 * | 9/2018 | Holley | F02C 7/00 |
| 2018/0355795 | A1 * | 12/2018 | Pal | F23R 3/42 |
| 2020/0132020 | A1 * | 4/2020 | Wickersham | F02C 3/16 |
| 2021/0164660 | A1 * | 6/2021 | Dyson | F23R 3/005 |
| 2022/0412291 | A1 * | 12/2022 | Song | F02C 7/00 |
| 2022/0412564 | A1 * | 12/2022 | Wu | F23R 7/00 |

OTHER PUBLICATIONS

Gamboa et al., Improvements in Fixed-Valve Micropump Performance Through Shape Optimization of Valves, Journal of Fluids Engineering, Mar. 2005, vol. 127.
Thompson et al., Numerical Investigation of Multistaged Tesla Valves, Journal of Fluids Engineering, Aug. 2014, vol. 136.
Lin et al., Topology Optimization of Fixed-Geometry Fluid Diodes, Journal of Mechanical Design, Aug. 2015, vol. 137.
Tesar et al., Valve-Less Rectification Pumps, Encyclopedia of Microfluidics and Nanofluidics 2015.
Khabarova et al., Experimental Investigation of Fluidic Diodes, Procedia Engineering 206 (2017) 93-98.
Vries et al., Design and operation of a Tesla-type valve for pulsating heat pipes, International Journal of Heat and Mass Transfer 105 (2017) 1-11.
Jin et al., Parametric study on Tesla valve with reverse flow for hydrogen decompression, International Journal of Hydrogen Energy 43 (2018) 8888-8896.
Qian et al., Hydrogen decompression analysis by multi-stage Tesla valves for hydrogen fuel cell, International Journal of Hydrogen Energy 44 (2019) 13666-13674.
Piyush et al., Heat transfer and fluid flow characteristics in multistaged Tesla valves, Numerical Heat Transfer, Part A: Applications, vol. 73, 2018, No. 6, 347-365.
Guo et al., Design Applicable 3D Microfluidic Functional Units Using 2D Topology Optimization with Length Scale Constraints, Micromachines 2020, 11, 613.

* cited by examiner

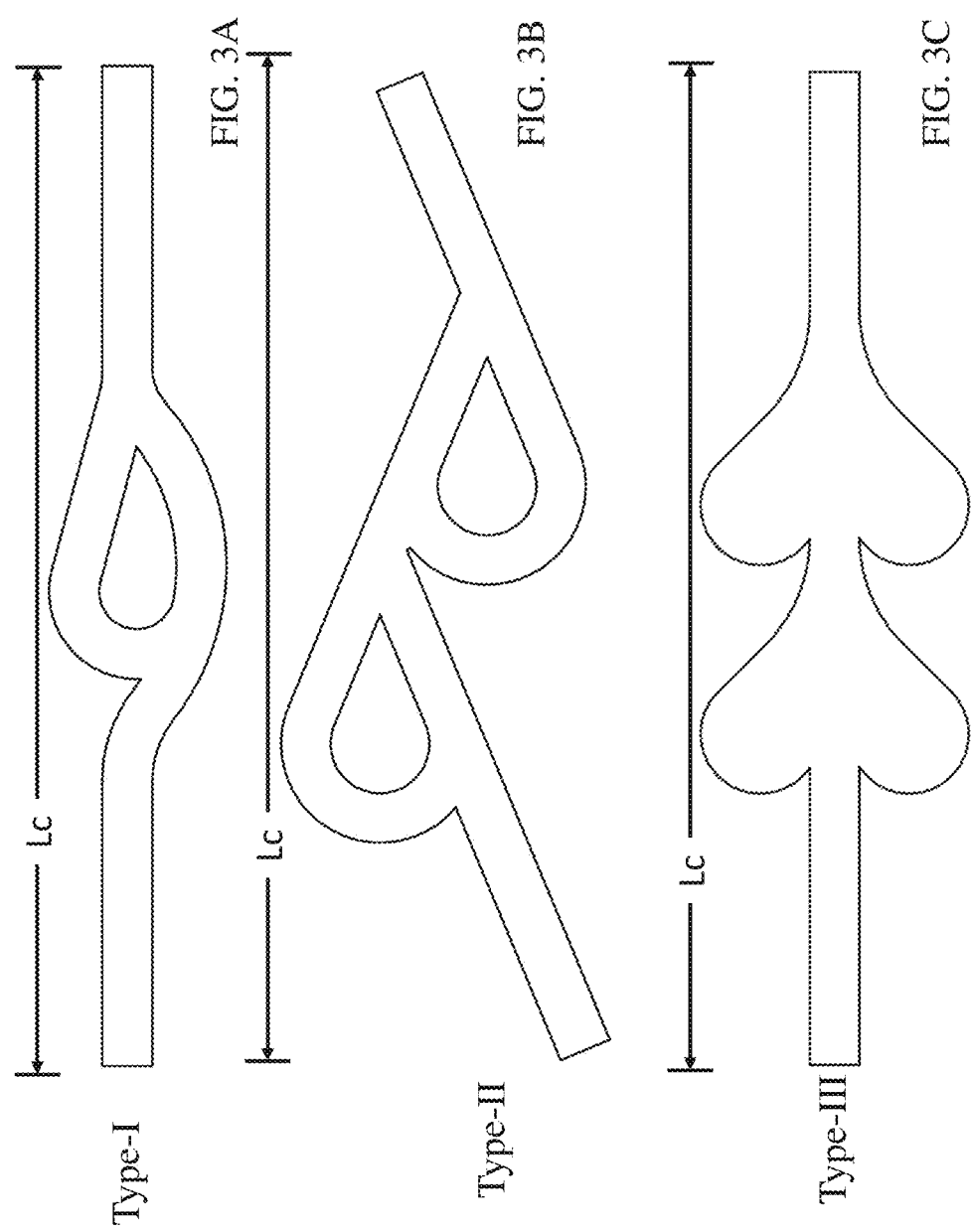

US 11,767,979 B2

INJECTION MANIFOLD WITH TESLA VALVES FOR ROTATING DETONATION ENGINES

CROSS-REFERENCE TO RELATED APPLICATIONS

The present patent application is related to and claims the priority benefit of U.S. Provisional Patent Application Ser. No. 63/126,987 filed Dec. 17, 2020, the contents of which are hereby incorporated by reference in its entirety into the present disclosure

STATEMENT REGARDING GOVERNMENT FUNDING

None.

TECHNICAL FIELD

The present disclosure generally relates to rotating detonation engines, and in particular, to a rotating detonation engine design with Tesla valves incorporated therein.

BACKGROUND

This section introduces aspects that may help facilitate a better understanding of the disclosure. Accordingly, these statements are to be read in this light and are not to be understood as admissions about what is or is not prior art.

In a conventional rotating detonation engine (RDE), fuel and an oxidizing agent are brought together in a detonation chamber where they are mixed and ignited via a pressure gain combustion process that is usually supersonic as is referred to as detonation.

When an RDE is compared to a traditional internal combustion engine, e.g., a reciprocating engine, or a gas turbine engine, or liquid-fueled rocket engines, one can see higher thermal efficiencies and significantly smaller number of moving parts resulting in lighter and more robust designs.

In a typical RDE, there exists an internal combustion chamber in the form of an inner cylindrical body, whereby fuel and an oxidizer, are injected therein from one or more annuluses formed between an outer cylindrical body and the inner cylindrical body (i.e., one for each of fuel and oxidizer), also referred to as injection manifolds, allowed to be mixed in the combustion chamber, combusted (detonated) and produce work.

Once major issue with the RDEs is reverse flow into the injection manifold, which is caused by the high pressure behind the detonation wave. Such reverse flow is mainly responsible for detonation wave propagation instability owing to unwanted interruption of fuel and/or oxidizer flow. The propagation speed of detonation wave in RDEs is on the order of a few thousand of meters per second. Solutions such as mechanical check valve provide limited response time to the high-speed detonation wave propagation and are thus unsuitable.

Therefore, there is an unmet need for a novel approach to address the reverse flow challenge into the injection manifolds in an RDE causing detonation wave propagation instability.

SUMMARY

A rotating detonation engine (RDE) is disclosed. The RDE includes a housing, an injector assembly disposed within the housing. The injector assembly includes a fuel manifold, an oxidizer manifold, and a combustion chamber. Fuel from the fuel manifold and an oxidizer from the oxidizer manifold are combined and combusted in the combustion chamber. Each of the fuel and oxidizer manifolds communicates with the combustion chamber via a plurality of Tesla valves each via a corresponding port, wherein the plurality of Tesla valves substantially eliminate reverse flow of exhaust gases from the combustion chamber back to the fuel manifold or the oxidizer manifold.

A reverse flow prevention arrangement, is also disclosed. The arrangement includes a first chamber, a second chamber, and one or more Tesla valves each without any moving parts disposed between the first chamber and the second chamber terminating at a port, such that forward flow from the first chamber to the second chamber is allowed by the one or more Tesla valves but reverse flow is prevented from the second chamber to the first chamber.

BRIEF DESCRIPTION OF DRAWINGS

The patent or application file contains at least one drawing executed in color. Copies of this patent or patent application publication with color drawing(s) will be provided by the Office upon request and payment of the necessary fee.

FIGS. 3A, 3B, and 3C are schematics of Tesla valves of Type I, Type II, and Type III, respectively.

DETAILED DESCRIPTION

Figure 1:
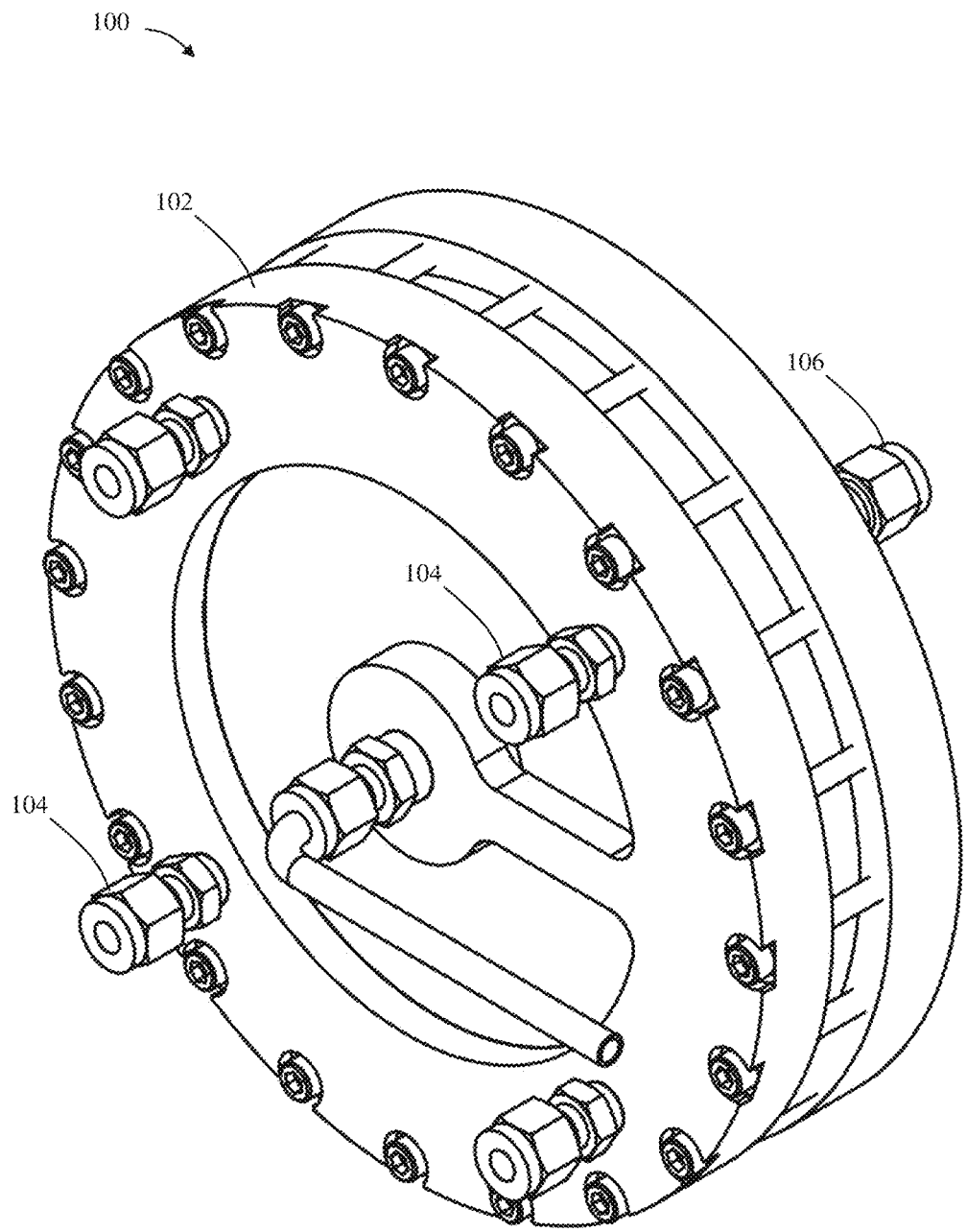
FIG. 1 is a perspective view of a rotating detonation engine (RDE) including a housing including an injector assembly.

For the purposes of promoting an understanding of the principles of the present disclosure, reference will now be made to the embodiments illustrated in the drawings, and specific language will be used to describe the same. It will nevertheless be understood that no limitation of the scope of this disclosure is thereby intended.

In the present disclosure, the term "about" can allow for a degree of variability in a value or range, for example, within 10%, within 5%, or within 1% of a stated value or of a stated limit of a range.

In the present disclosure, the term "substantially" can allow for a degree of variability in a value or range, for example, within 90%, within 95%, or within 99% of a stated value or of a stated limit of a range.

A novel approach is presented that addresses the reverse flow challenge into the injection manifolds in a rotating detonation engine (RDE, also known as continuous RDE or CRDE) causing detonation wave propagation instability. Towards this end, a reverse flow preventer mechanism is disclosed which can respond to the detonation wave dynamics requirements in order to eliminate or substantially reduce reverse flow into the injection manifolds.

Figure 2:
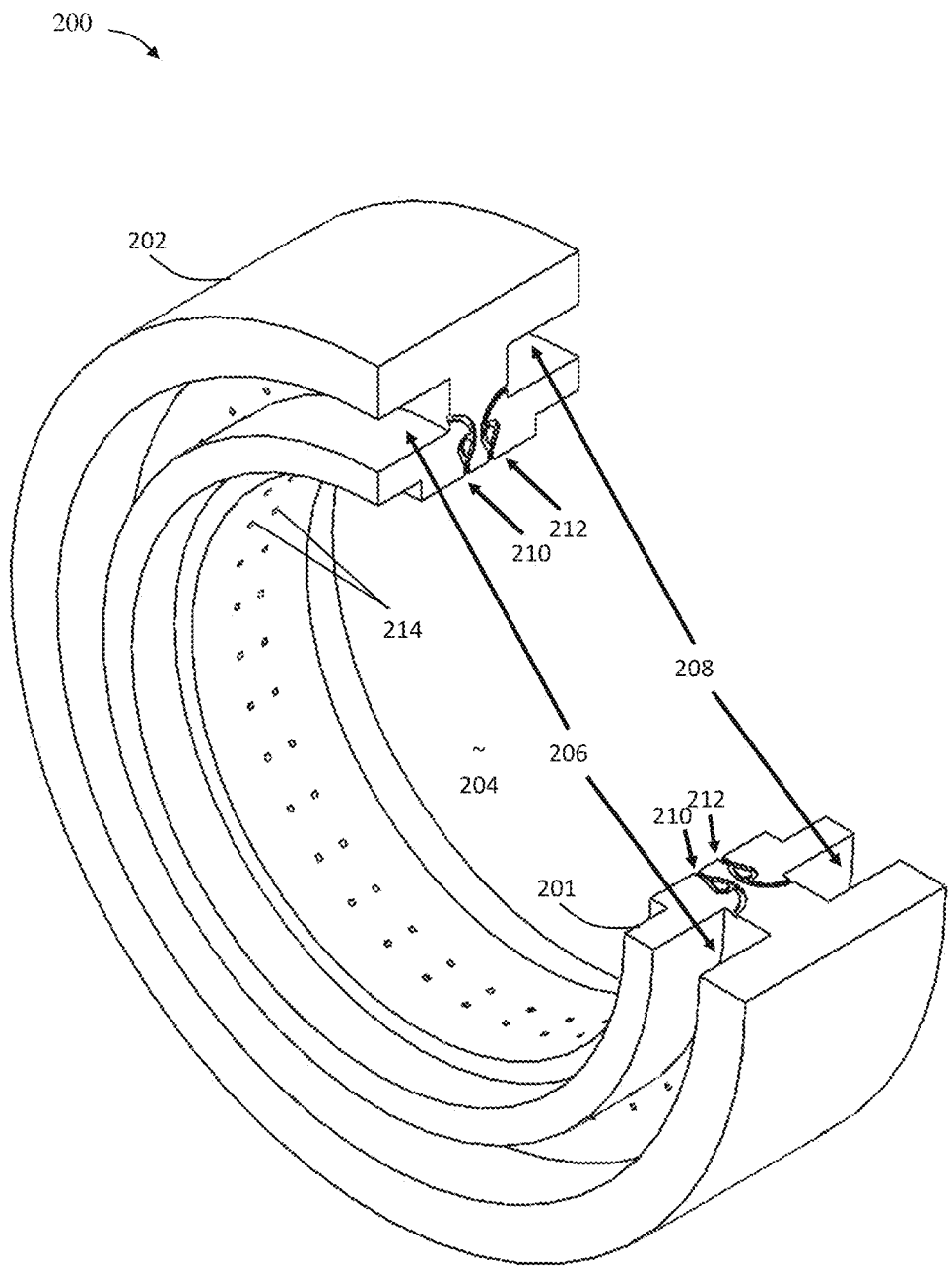
FIG. 2 is a perspective view an injector assembly showing two sets of Tesla valves of Type I shown and discussed with respect to FIG. 3A.

Referring to FIG. 1, a perspective view of an RDE 100 is shown. The RDE 100 includes a housing 102 and ports 104 and 106 for inputting fuel and oxidizers (ports for fuel, i.e., ports 104 are disposed on one side while ports for oxidizers, i.e., ports 106 are disposed on the opposite side). The housing 102 includes an inner cylindrical body 201 and an outer cylindrical body 202, the space within the inner cylindrical body 201 forming a cylindrical annulus 204 that provides a combustion chamber, best shown in FIG. 2, showing an example injector assembly 200. The space between the inner cylindrical body 201 and the outer cylindrical body 202 forms two separated regions forming a fuel injection manifold 206 and an oxidizer injection manifold 208, each in the form of a cylindrical annulus, although interchangeable. The space within the inner cylindrical body 201 forms the combustion chamber 204, within which detonation occurs. Each of the two manifolds fluidly communicates with the combustion chamber via a plurality of Tesla valves. In FIG. 2, two sets of such Tesla valves 210 and 212 are shown, however, it should be appreciated a large number of the valves are disposed circumferentially about the two annuluses, each valve terminating into the combustion chamber 204 via a port 214. Tesla valves 210 are responsible for fluid communication between the fuel injection manifold 206 and the combustion chamber 204, while Tesla valves 212 are responsible for fluid communication between the oxidizer injection manifold 208 and the combustion chamber 204.

Thus, the approach shown in FIG. 2 provides a novel injection manifold design for rotation detonation engines (RDEs). In conventional RDEs, high pressure ratio of detonation wave can cause reverse flow between the combustion chamber 204 and the fuel injection manifold 206 or the oxidizer injection manifold 208 due to the sudden pressure rise after the generation of the detonation wave. Reverse flow has been identified as one of the most critical issues in RDEs that are responsible for detonation wave propagation instability. Fluidic-controlled injectors, which have minimal response time to detonation-induced back flow, can contribute to the overall flow and detonation stability by substantially eliminating reverse flow between the combustion chamber 204 and the fuel injection manifold 206 or the oxidizer injection manifold 208. As such, Tesla-valve-based injection manifolds have a fluidic reverse-resistive mechanism capable of suppressing detonation wave bifurcation and combination and thus enhancing stability. Owing to the Tesla valves 210 and 212, the fuel injection manifold 206 and the oxidizer injection manifold 208 have fluidic reverse-resistive mechanisms to mitigate against the reverse flow in the injector arrays caused by the high pressure behind the detonation wave. Thus the fuel injection manifold 206 and the oxidizer injection manifold 208 with the aid of the Tesla valves 210 and 212 suppress reverse flow and thus enhance stability of RDEs.

Injection manifolds with complex curved internal channels such as the Tesla-valve-based injectors described herein (see below for additional detail and designs) can be manufactured via a number of techniques, especially additive manufacturing, which can achieve high accuracy manufacturing using a variety of materials, such as metals stainless steel/oxidation-corrosion resistant alloys (e.g., INCONEL®)/titanium alloys/ceramics nanopowders, achieving a resolution of 20 μm.

Tesla valves according to the present disclosure each includes a fixed geometry passive check valve that allows a fluid to flow preferentially in one direction without any moving parts. The valves are structures that have a higher pressure drop for the flow in one direction (reverse) than the other (forward). Principals of fluid dynamics and momentum inertia allow the fluid to flow through a different flowpaths created by channel shape pattern and/or volume expansion/shrink in reverse direction. The high total pressure loss is caused by the fluid-to-wall and/or fluid-to-fluid (self) impingement . . . .

The Tesla valves, according to the present disclosure include three types. These three types are shown in FIGS. 3A-3C. It should be noted that the injector assembly shown in FIG. 2, provides examples of Type-I shown in FIG. 3A. The plurality of Tesla valve includes shapes selected form the group consisting of looped-shaped terminated with elongated ends (see FIG. 3A), an offset figure-8 shaped conduit terminated with elongated ends (see FIG. 3B), and a double spade-shaped conduit terminated with elongated ends (see FIG. 3C). In each of FIGS. 3A, 3B, and 3C a characteristic length Lc is shown. The length Lc represents the length of the Tesla valve that is between a first chamber (e.g., a fuel or oxidizer manifold) and a second chamber (e.g., a combustion chamber).

Figure 3D:
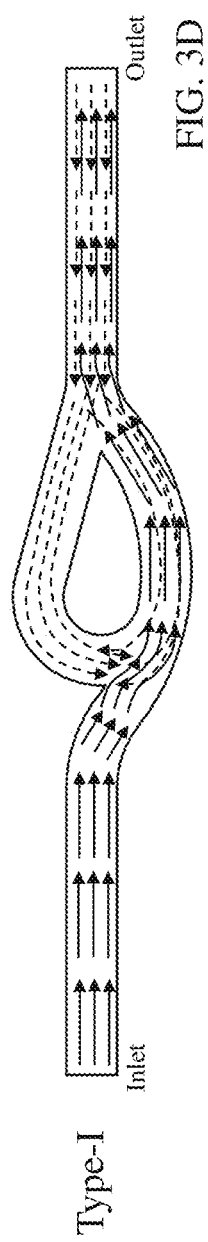
FIGS. 3D, 3E, and 3F are schematics of Tesla valves showing flow patterns of Type I, Type II, and Type III, respectively.

Referring to FIG. 3D, the Type-I Tesla valve of FIG. 3A is shown with flow pattern showing forward (solid lines) and reverse fluid flow (dashed lines) depicting pressure loss by fluid-to-fluid self-impingement in the reverse fluid direction. Type-I includes a single loop pattern, wherein the loop is divided into two segments one longer than the other. Fluid flow (i.e., fuel or oxidizer) begins from the side identified as inlet and is shown as solid lines. Substantially all of the fluid in the forward direction passes through the shorter loop segment towards the outlet. The reverse flow of the exhaust is shown in dashed lines and moves from the side identified as outlet to the loop and advances through both segments of the loop. The reverse flow of the exhaust fluid (dashed lines) self-impinges on itself, thus preventing the exhaust fluid to advance to the inlet side.

Figure 3E:
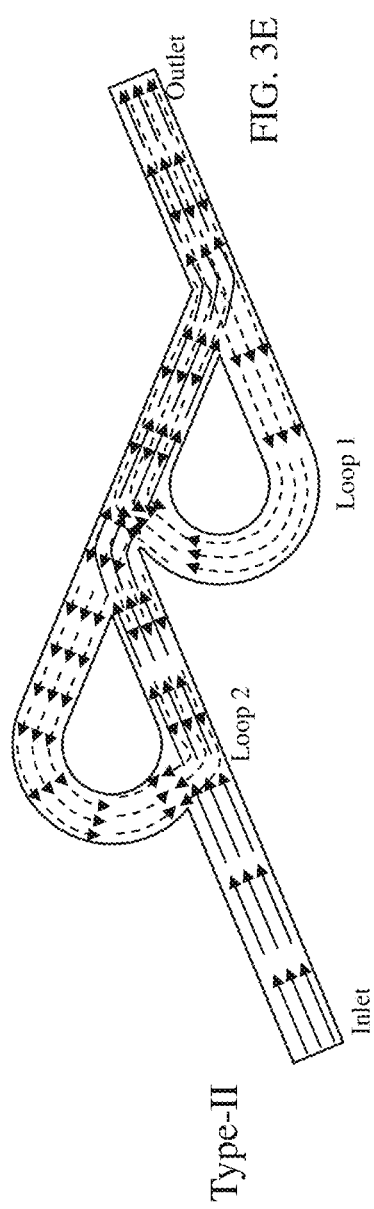

Referring to FIG. 3E, the Type-II Tesla valve of FIG. 3B is shown with flow pattern showing forward (solid lines) and reverse fluid flow (dashed lines) depicting pressure loss by fluid-to-fluid self-impingement in the reverse fluid direction. Type-II includes a double loop pattern, wherein each loop of the double loop pattern is divided into two segments one longer than the other. Fluid flow (i.e., fuel or oxidizer) begins from the side identified as inlet and is shown as solid lines. Substantially all of the fluid in the forward direction passes through the shorter loop segment of each of the loops of the double loop configuration towards the outlet. The reverse flow of the exhaust is shown in dashed lines and moves from the side identified as outlet toward the double loop and advances through both segments of each of the two loops. The reverse flow of the exhaust fluid (dashed lines) self-impinges on itself at the end of the first loop (Loop 1) thus substantially preventing the exhaust fluid to advance beyond the first loop. Any amount of exhaust fluid that happened to escape the first loop enters the second loop (Loop 2) and again advances through both segments of the second loop (smaller arrows indicate a smaller residual flow in the second loop). Again, the reverse flow of the exhaust fluid (dashed lines) self-impinges on itself at the end of the second loop (Loop 2) thus substantially preventing the exhaust fluid to advance beyond the second loop towards the inlet.

Figure 3F:
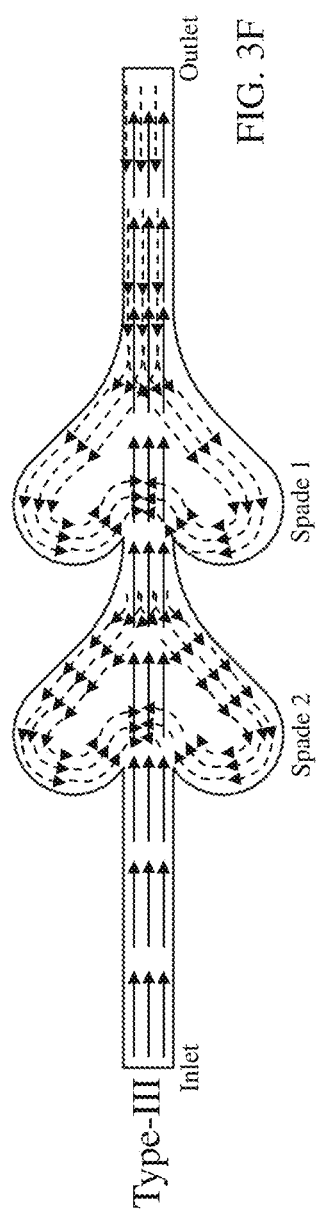

Referring to FIG. 3F, the Type-III Tesla valve of FIG. 3C is shown with flow pattern showing forward (solid lines) and reverse fluid flow (dashed lines) depicting pressure loss by fluid-to-fluid self-impingement in the reverse fluid direction. Type-III includes a double spade-shape pattern. Fluid flow (i.e., fuel or oxidizer) begins from the side identified as inlet and is shown as solid lines. Substantially all of the fluid in the forward direction passes through the spade-shaped patterns towards the outlet. The reverse flow of the exhaust is shown in dashed lines and moves from the side identified as outlet toward the two spade-shaped configuration and advances through both each. The reverse flow of the exhaust fluid (dashed lines) self-impinges on itself at the end of each spade-shaped patter thus substantially preventing the exhaust fluid to advance beyond the first spade (Spade 1). Any amount of exhaust fluid that happened to escape Spade 1 enters the second spade-shape pattern (Spade 2) wherein smaller arrows indicate a smaller residual flow in Spade 2. Again, the reverse flow of the exhaust fluid (dashed lines) self-impinges on itself at the end of Spade 2 thus substantially preventing the exhaust fluid to advance beyond Spade 2 towards the inlet. The Type-III valve creates a volume expansion to direct the majority of reverse flow to impinge on the wall. The fluid flows back to its original direction after impingement can further prevent the reverse flow.

Figure 4C:
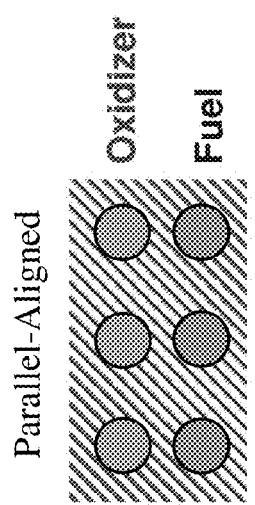
FIGS. 4A, 4B, and 4C are schematics of port configuration for parallel-aligned, parallel-misaligned, and aligned series, where in each configuration ports coupled to fuel manifold and oxidizer manifold are provided according to the stated configuration.
Figure 4B:
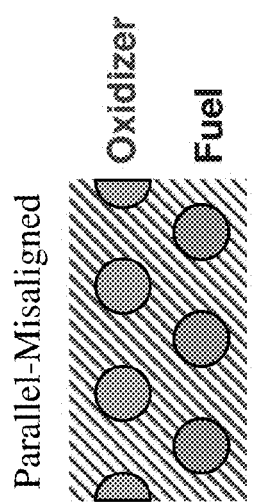
Figure 4A:
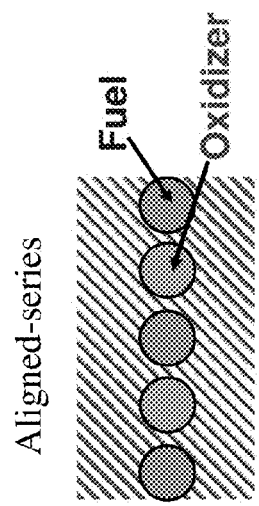
Figure 5:
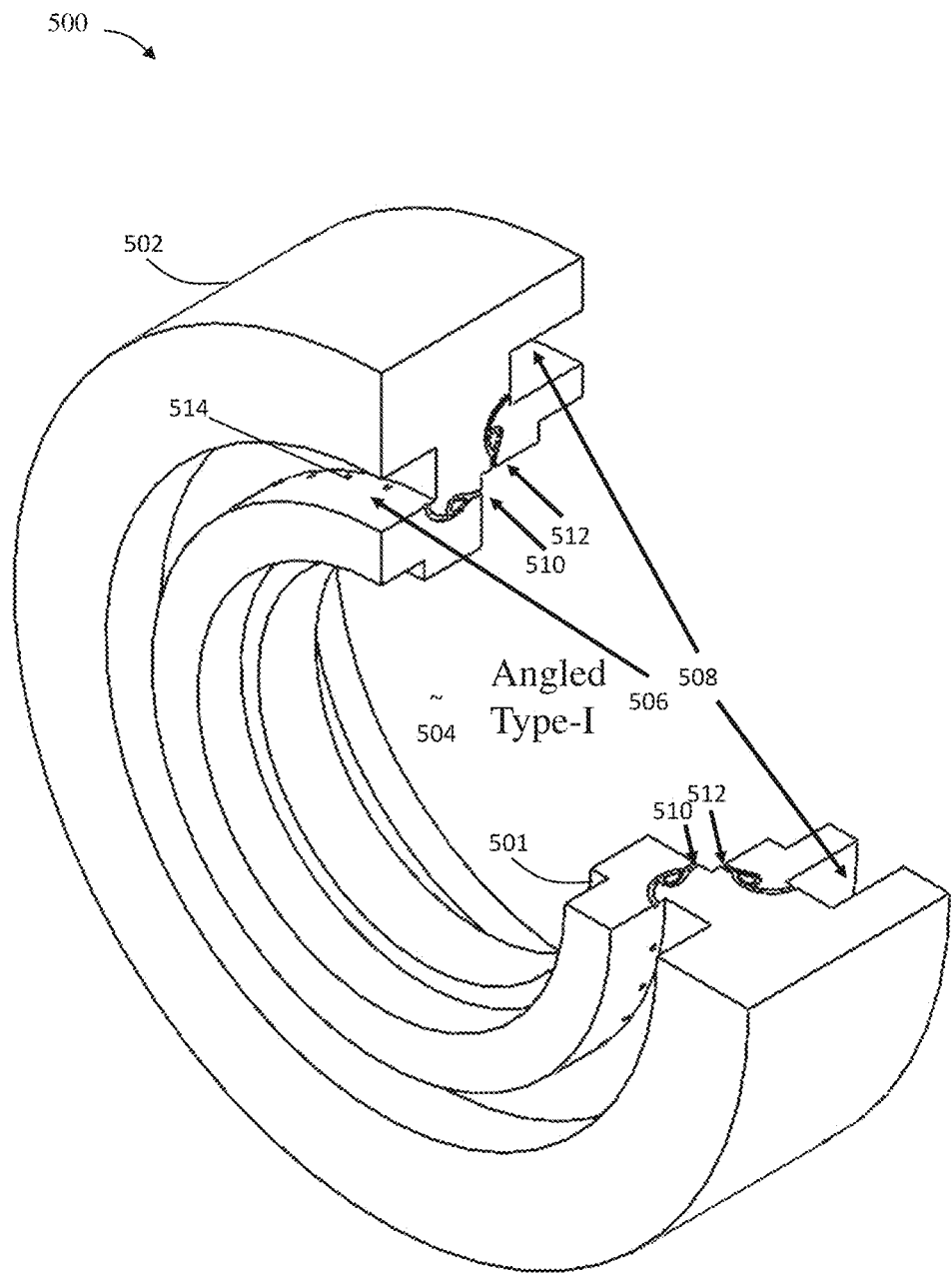
FIG. 5 is a perspective view of an injector assembly showing another configuration of port disposition wherein ports coupled to the fuel manifold and the oxidizer manifold are provided at an angled relationship.

In addition to the three types of Tesla Valves shown in FIGS. 3A-3C, these valves can be configured according to at least 4 different configurations, shown in FIGS. 4A-4C and FIG. 5. FIG. 4A presents a parallel-aligned configuration wherein the fuel and oxidizer ports form two parallel and aligned circles about the inner surface of the inner cylindrical body. This configuration is shown in FIG. 2, as well. FIG. 4B represents a parallel but misaligned configuration wherein the fuel and oxidizer ports form two parallel and misaligned circles about the inner surface of the inner cylindrical body. FIG. 4C represents an aligned-series configuration wherein the fuel and oxidizer ports form a single aligned and series circle about the inner surface of the inner cylindrical body. FIG. 5 represents an angled configuration wherein the fuel and oxidizer ports and manifolds form angled relationship with one-another (90° shown, however, other angles are also possible).

With further reference to FIG. 5, Type-I (see FIG. 3A) is shown in an angled configuration. In this configuration, an example of an injector assembly 500 is shown which includes an inner cylindrical body 501 and an outer cylindrical body 502, the space within the cylindrical body 501 forming a cylindrical annulus 504, that provides the combustion chamber. The space between the inner cylindrical body 501 and the outer cylindrical body 502 forms two separated regions forming a fuel injection manifold 506 and an oxidizer injection manifold 508, each in the form of a cylindrical annulus, although interchangeable. The space within the inner cylindrical body 501 forms the combustion chamber 504, within which detonation occurs. Each of the two manifolds fluidly communicates with the combustion chamber via a plurality of Tesla valves. In FIG. 5, two sets of such Tesla valves 510 and 512 are shown, however, it should be appreciated a large number of the valves are disposed circumferentially about the two annuluses, each valve terminating into the combustion chamber 504 via a port 514 (for clarity the ports 514 are not shown on the inner surface of inner cylindrical body 501). Tesla valves 510 are responsible for fluid communication between the fuel injection manifold 506 and the combustion chamber 504, while Tesla valves 512 are responsible for fluid communication between the oxidizer injection manifold 508 and the combustion chamber 504. The Tesla valves 510 and 512 are positioned in an angled configuration with respect to one-another bringing fuel and the oxidizer agent for combustion into the combustion chamber 504.

Referring to FIGS. 6-15, various combinations of Tesla valve and the above-described configurations are shown. These various configurations while shown as individual instances, can be combined for additional tunability, e.g., a number of valves can be Tesla valve type-I and others Tesla valves type-II both in the same injector assembly. Alternatively, different configurations (see FIGS. 4A-4C and 5) may be used in the same injector assembly.

Figure 6:
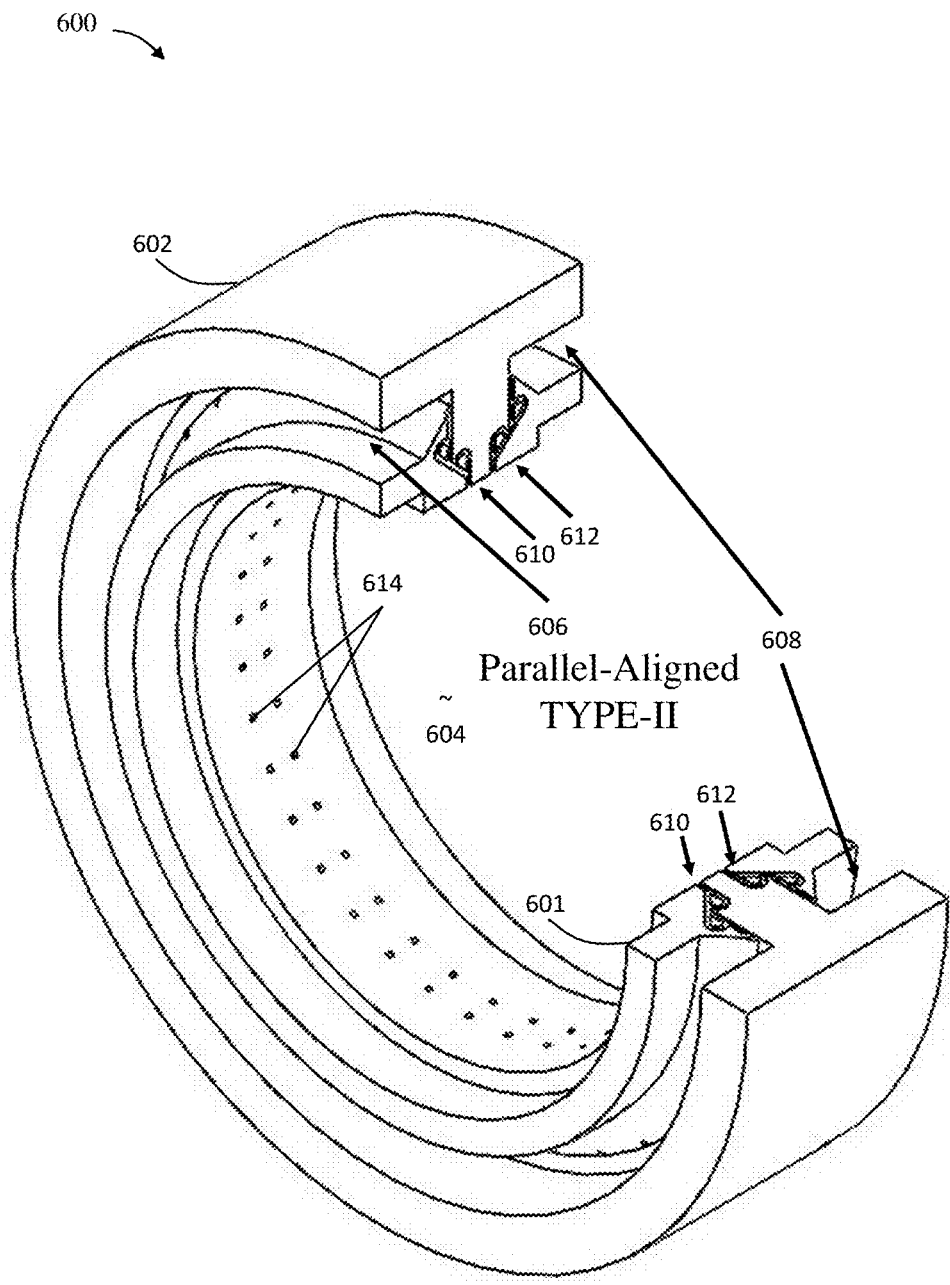
FIG. 6 is perspective view of an injector assembly wherein the port/Tesla valve configuration is parallel-aligned/Type II.

In particular, with further reference to FIG. 6, Type-II (see FIG. 3B) is shown in a parallel-aligned configuration (see FIG. 4A). In this configuration, an example of an injector assembly 600 is shown which includes an inner cylindrical body 601 and an outer cylindrical body 602, the space within the cylindrical body 601 forming a cylindrical annulus 604, that provides the combustion chamber. The space between the inner cylindrical body 601 and the outer cylindrical body 602 forms two separated regions forming a fuel injection manifold 606 and an oxidizer injection manifold 608, each in the form of a cylindrical annulus, although interchangeable. The space within the inner cylindrical body 601 forms the combustion chamber 604, within which detonation occurs. Each of the two manifolds fluidly communicates with the combustion chamber via a plurality of Tesla valves. In FIG. 6, two sets of such Tesla valves 610 and 612 are shown, however, it should be appreciated a large number of the valves are disposed circumferentially about the two annuluses, each valve terminating into the combustion chamber 604 via a port 614. Tesla valves 610 are responsible for fluid communication between the fuel injection manifold 606 and the combustion chamber 604, while Tesla valves 612 are responsible for fluid communication between the oxidizer injection manifold 608 and the combustion chamber 604. The Tesla valves 610 and 612 are positioned in a parallel-aligned configuration with respect to one-another bringing fuel and the oxidizer agent for combustion into the combustion chamber 604.

Figure 7:
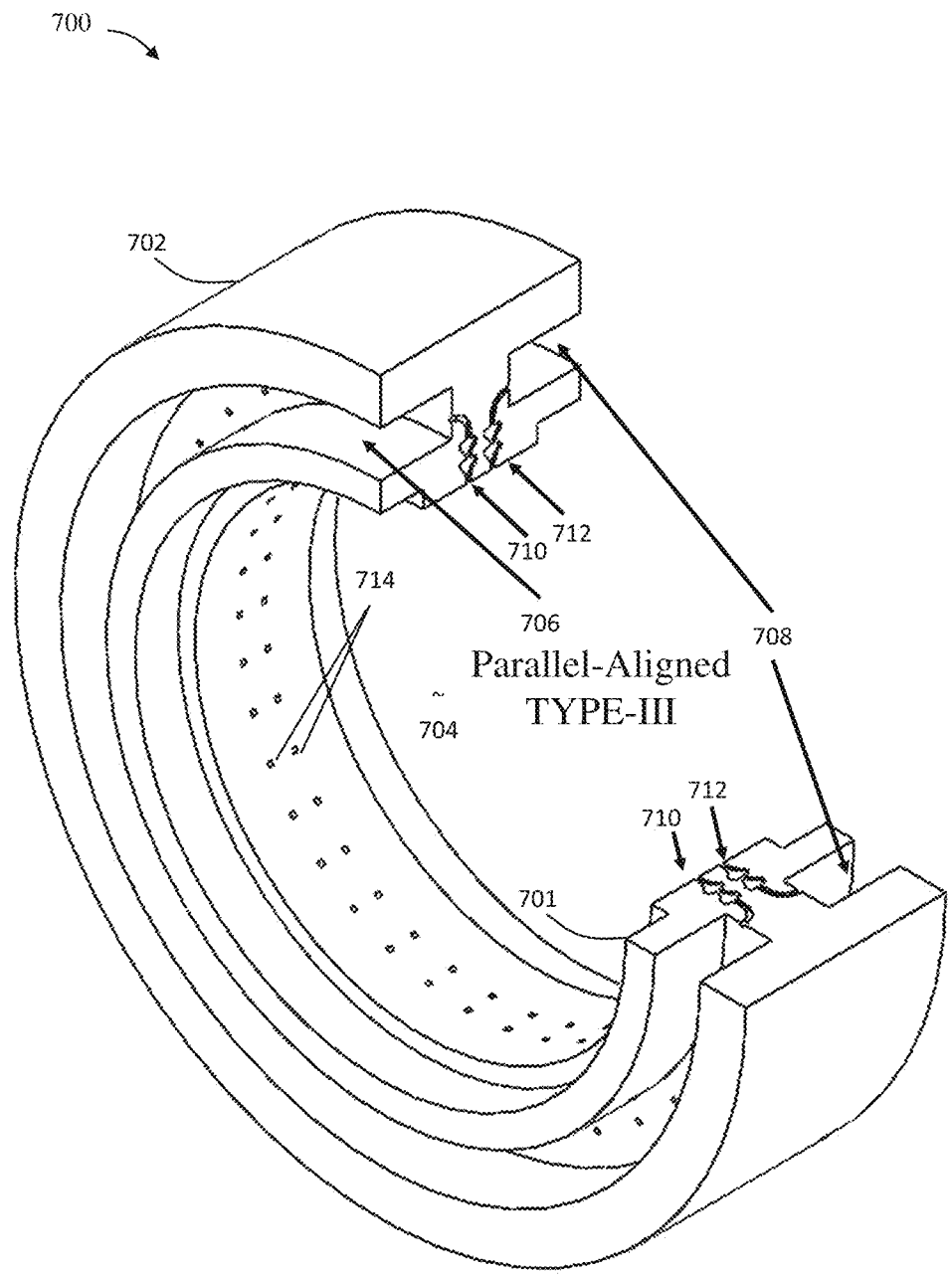
FIG. 7 is perspective view of an injector assembly wherein the port/Tesla valve configuration is parallel-aligned/Type III.

With further reference to FIG. 7, Type-III (see FIG. 3C) is shown in a parallel-aligned configuration (see FIG. 4A). In this configuration, an example of an injector assembly 700 is shown which includes an inner cylindrical body 701 and an outer cylindrical body 702, the space within the cylindrical body 701 forming a cylindrical annulus 704, that provides the combustion chamber. The space between the inner cylindrical body 701 and the outer cylindrical body 702 forms two separated regions forming a fuel injection manifold 706 and an oxidizer injection manifold 708, each in the form of a cylindrical annulus, although interchangeable. The space within the inner cylindrical body 701 forms the combustion chamber 704, within which detonation occurs. Each of the two manifolds fluidly communicates with the combustion chamber via a plurality of Tesla valves. In FIG. 7, two sets of such Tesla valves 710 and 712 are shown, however, it should be appreciated a large number of the valves are disposed circumferentially about the two annuluses, each valve terminating into the combustion chamber 704 via a port 714. Tesla valves 710 are responsible for fluid communication between the fuel injection manifold 706 and the combustion chamber 704, while Tesla valves 712 are responsible for fluid communication between the oxidizer injection manifold 708 and the combustion chamber 704. The Tesla valves 710 and 712 are positioned in a parallel-aligned configuration with respect to one-another bringing fuel and the oxidizer agent for combustion into the combustion chamber 704.

Figure 8:
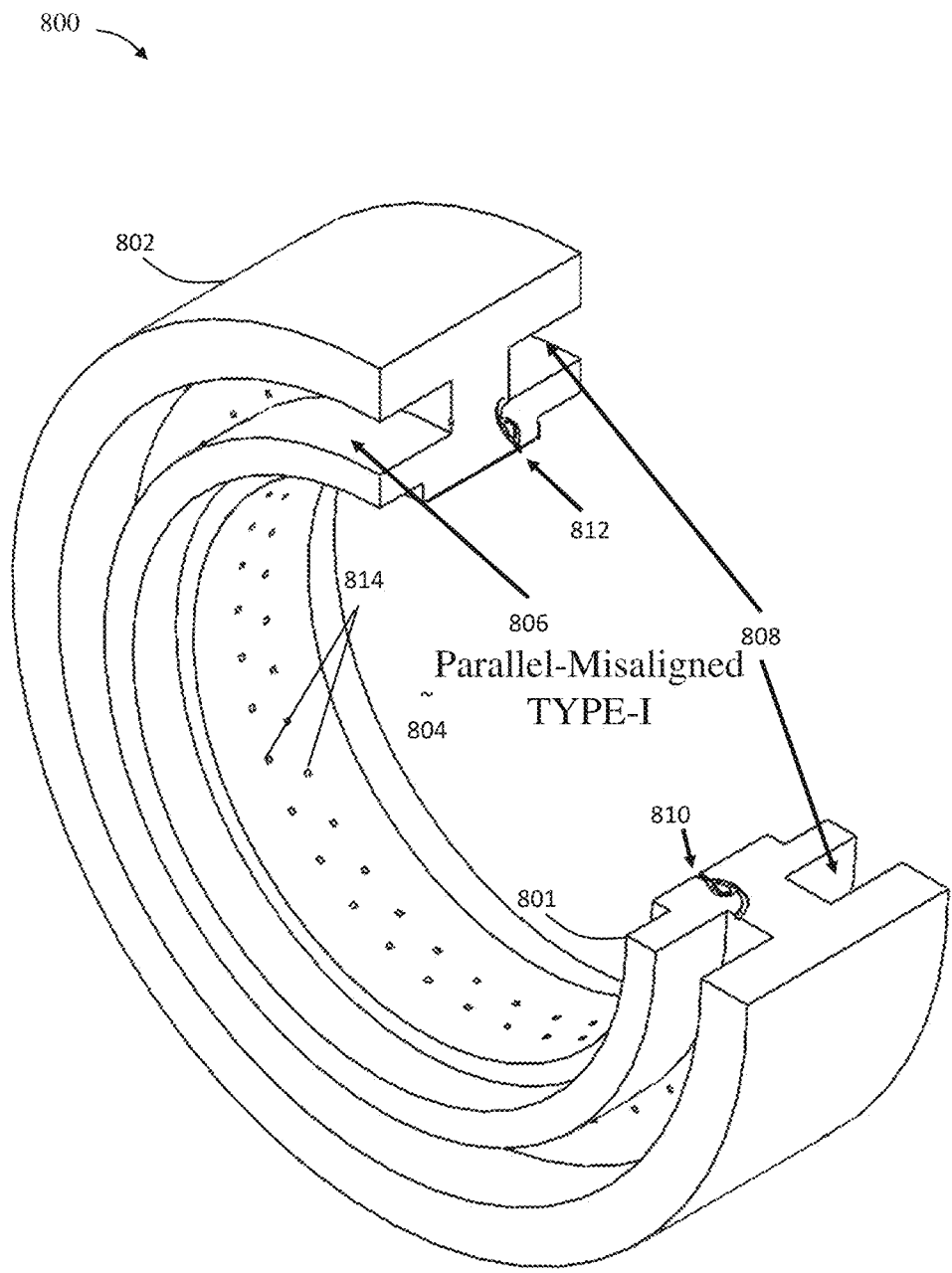
FIG. 8 is perspective view of an injector assembly wherein the port/Tesla valve configuration is parallel-misaligned/Type I.

With further reference to FIG. 8, Type-I (see FIG. 3A) is shown in a parallel-misaligned configuration (see FIG. 4B). In this configuration, an example of an injector assembly 800 is shown which includes an inner cylindrical body 801 and an outer cylindrical body 802, the space within the cylindrical body 801 forming a cylindrical annulus 804, that provides the combustion chamber. The space between the inner cylindrical body 801 and the outer cylindrical body 802 forms two separated regions forming a fuel injection manifold 806 and an oxidizer injection manifold 808, each in the form of a cylindrical annulus, although interchangeable. The space within the inner cylindrical body 801 forms the combustion chamber 804, within which detonation occurs. Each of the two manifolds fluidly communicates with the combustion chamber via a plurality of Tesla valves. In FIG. 8, one set of such Tesla valves 810 and 812 are shown, however, it should be appreciated a large number of the valves are disposed circumferentially about the two annuluses, each valve terminating into the combustion chamber 804 via a port 814 that are unlike previous embodiment are parallel but misaligned. Tesla valves 810 are responsible for fluid communication between the fuel injection manifold 806 and the combustion chamber 804, while Tesla valves 812 are responsible for fluid communication between the oxidizer injection manifold 808 and the combustion chamber 804. Thus, the Tesla valves 810 and 812 are positioned in a parallel-misaligned configuration with respect to one-another bringing fuel and the oxidizer agent for combustion into the combustion chamber 804.

Figure 9:
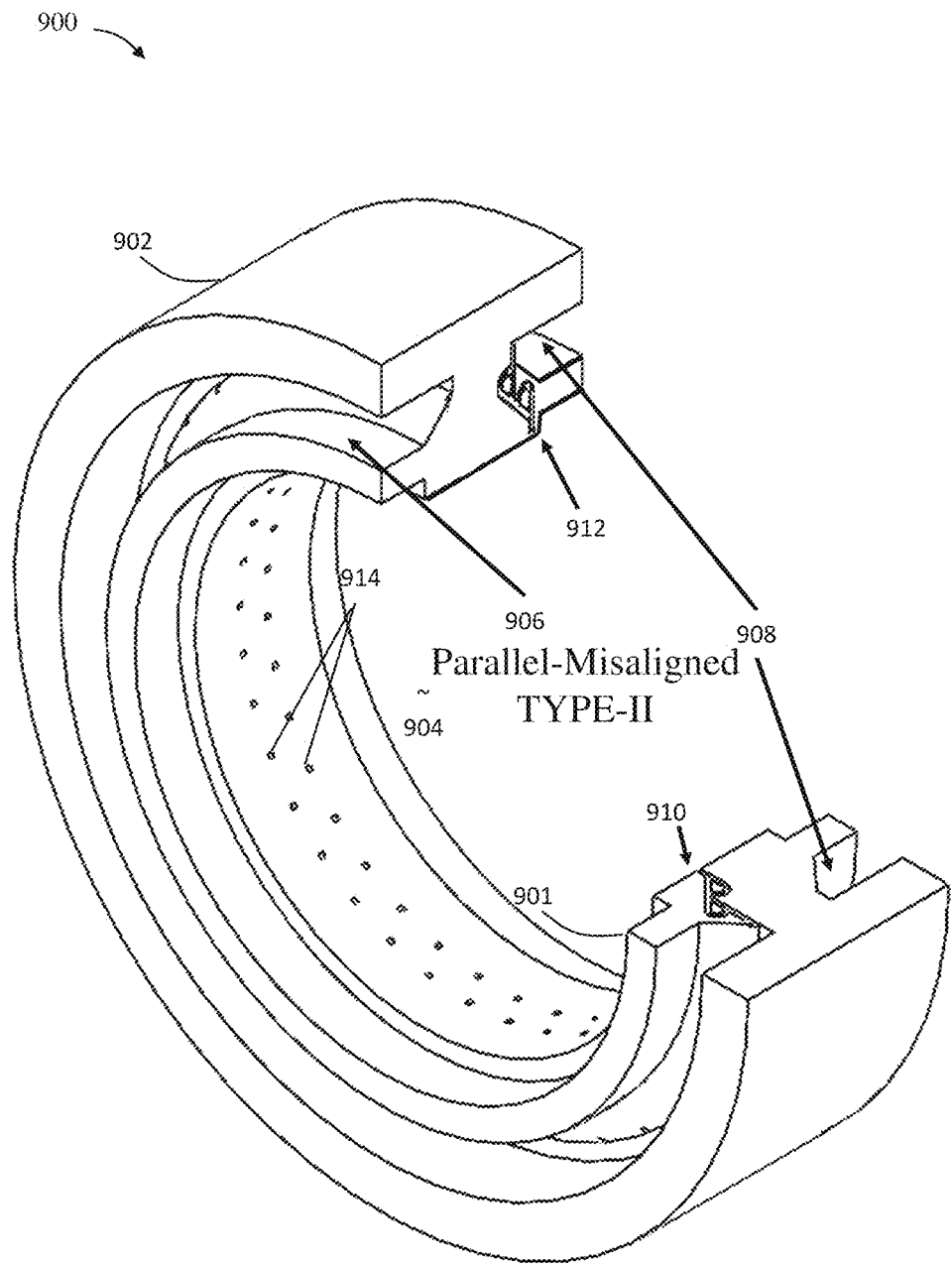
FIG. 9 is perspective view of an injector assembly wherein the port/Tesla valve configuration is parallel-misaligned/Type II.

With further reference to FIG. 9, Type-II (see FIG. 3B) is shown in a parallel-misaligned configuration (see FIG. 4B). In this configuration, an example of an injector assembly 900 is shown which includes an inner cylindrical body 901 and an outer cylindrical body 902, the space within the cylindrical body 901 forming a cylindrical annulus 904, that provides the combustion chamber. The space between the inner cylindrical body 901 and the outer cylindrical body 902 forms two separated regions forming a fuel injection manifold 906 and an oxidizer injection manifold 908, each in the form of a cylindrical annulus, although interchangeable. The space within the inner cylindrical body 901 forms the combustion chamber 904, within which detonation occurs. Each of the two manifolds fluidly communicates with the combustion chamber via a plurality of Tesla valves. In FIG. 9, one set of such Tesla valves 910 and 912 are shown, however, it should be appreciated a large number of the valves are disposed circumferentially about the two annuluses, each valve terminating into the combustion chamber 904 via a port 914 that are parallel but misaligned. Tesla valves 910 are responsible for fluid communication between the fuel injection manifold 906 and the combustion chamber 904, while Tesla valves 912 are responsible for fluid communication between the oxidizer injection manifold 908 and the combustion chamber 904. Thus, the Tesla valves 910 and 912 are positioned in a parallel-misaligned configuration with respect to one-another bringing fuel and the oxidizer agent for combustion into the combustion chamber 904.

Figure 10:
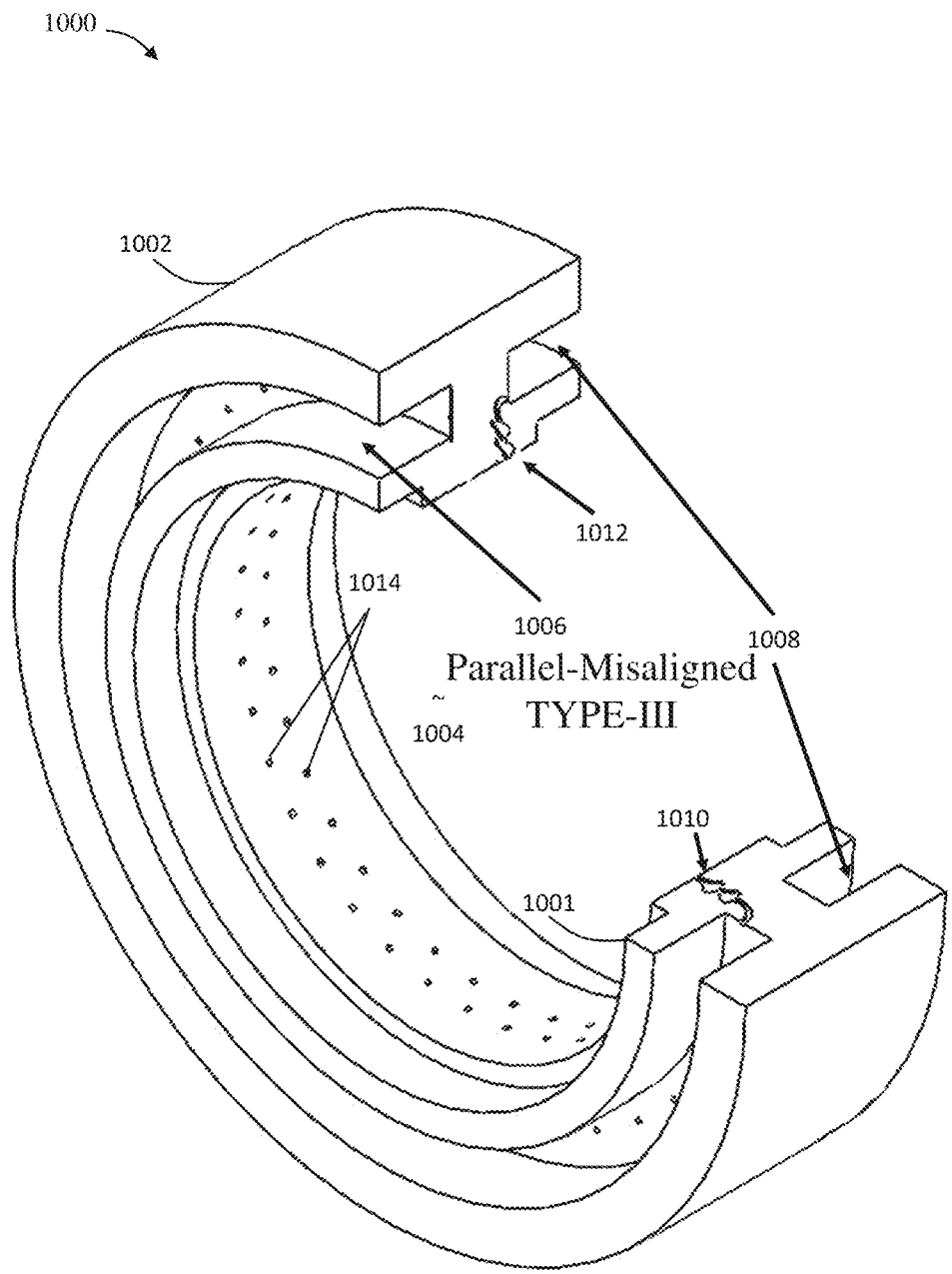
FIG. 10 is perspective view of an injector assembly wherein the port/Tesla valve configuration is parallel-misaligned/Type III.

With further reference to FIG. 10, Type-III (see FIG. 3C) is shown in a parallel-misaligned configuration (see FIG. 4B). In this configuration, an example of an injector assembly 1000 is shown which includes an inner cylindrical body 1001 and an outer cylindrical body 1002, the space within the cylindrical body 1001 forming a cylindrical annulus 1004, that provides the combustion chamber. The space between the inner cylindrical body 1001 and the outer cylindrical body 1002 forms two separated regions forming a fuel injection manifold 1006 and an oxidizer injection manifold 1008, each in the form of a cylindrical annulus, although interchangeable. The space within the inner cylindrical body 1001 forms the combustion chamber 1004, within which detonation occurs. Each of the two manifolds fluidly communicates with the combustion chamber via a plurality of Tesla valves. In FIG. 10, one set of such Tesla valves 1010 and 1012 are shown, however, it should be appreciated a large number of the valves are disposed circumferentially about the two annuluses, each valve terminating into the combustion chamber 1004 via a port 1014 that are parallel but misaligned. Tesla valves 1010 are responsible for fluid communication between the fuel injection manifold 1006 and the combustion chamber 1004, while Tesla valves 1012 are responsible for fluid communication between the oxidizer injection manifold 1008 and the combustion chamber 1004. Thus, the Tesla valves 1010 and 1012 are positioned in a parallel-misaligned configuration with respect to one-another bringing fuel and the oxidizer agent for combustion into the combustion chamber 1004.

Figure 11:
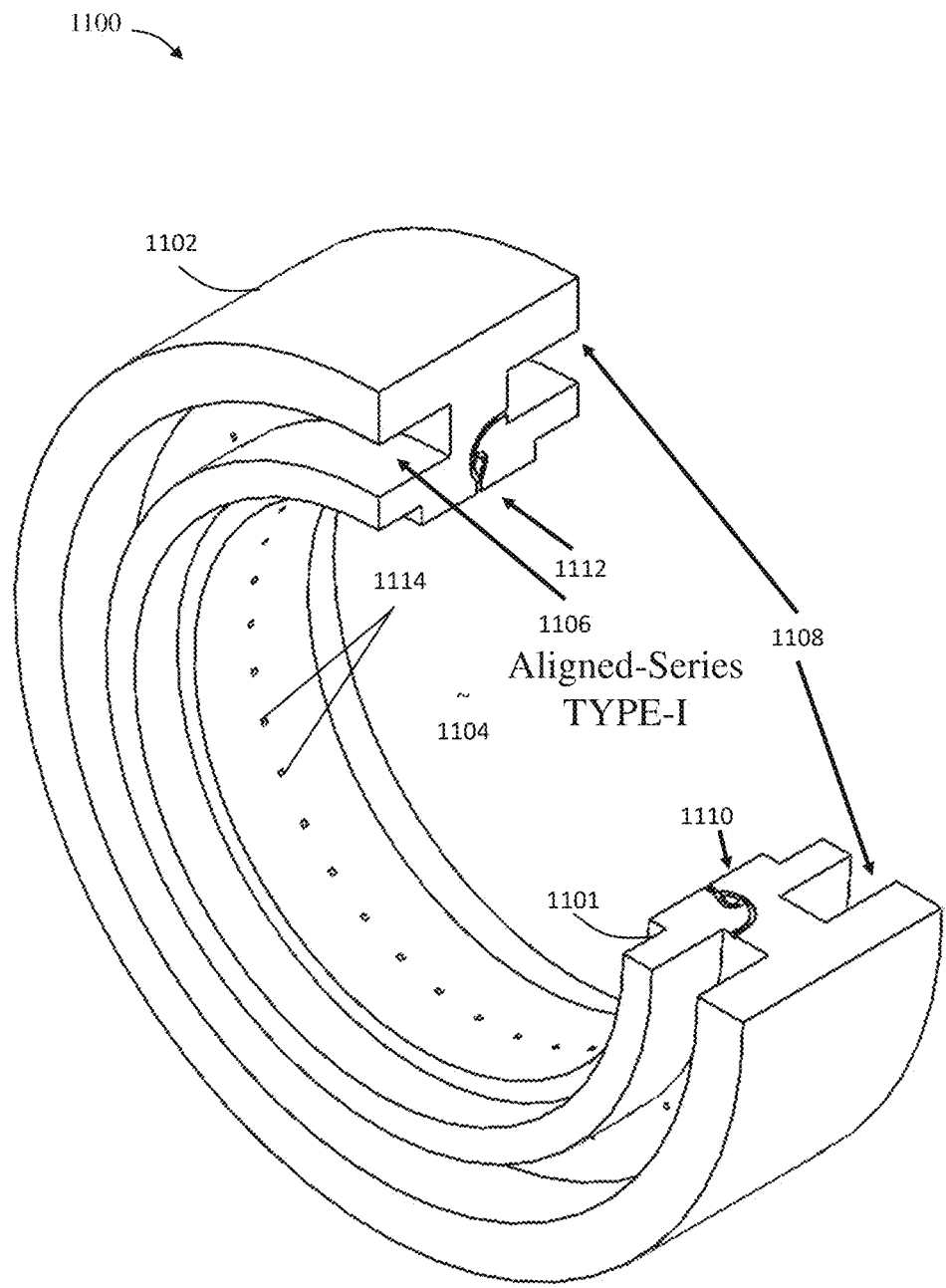
FIG. 11 is perspective view of an injector assembly wherein the port/Tesla valve configuration is aligned-series/Type I.

With further reference to FIG. 11, Type-I (see FIG. 3A) is shown in an aligned-series configuration (see FIG. 4C). In this configuration, an example of an injector assembly 1100 is shown which includes an inner cylindrical body 1101 and an outer cylindrical body 1102, the space within the cylindrical body 1101 forming a cylindrical annulus 1104, that provides the combustion chamber. The space between the inner cylindrical body 1101 and the outer cylindrical body 1102 forms two separated regions forming a fuel injection manifold 1106 and an oxidizer injection manifold 1108, each in the form of a cylindrical annulus, although interchangeable. The space within the inner cylindrical body 1101 forms the combustion chamber 1104, within which detonation occurs. Each of the two manifolds fluidly communicates with the combustion chamber via a plurality of Tesla valves. In FIG. 11, one set of such Tesla valves 1110 and 1112 are shown, however, it should be appreciated a large number of the valves are disposed circumferentially about the two annuluses, each valve terminating into the combustion chamber 1104 via a port 1114 that are aligned and provided in series. Tesla valves 1110 are responsible for fluid communication between the fuel injection manifold 1106 and the combustion chamber 1104, while Tesla valves 1112 are responsible for fluid communication between the oxidizer injection manifold 1108 and the combustion chamber 1104. Thus, the Tesla valves 1110 and 1112 are positioned in an aligned-series configuration with respect to one-another bringing fuel and the oxidizer agent for combustion into the combustion chamber 1104.

Figure 12:
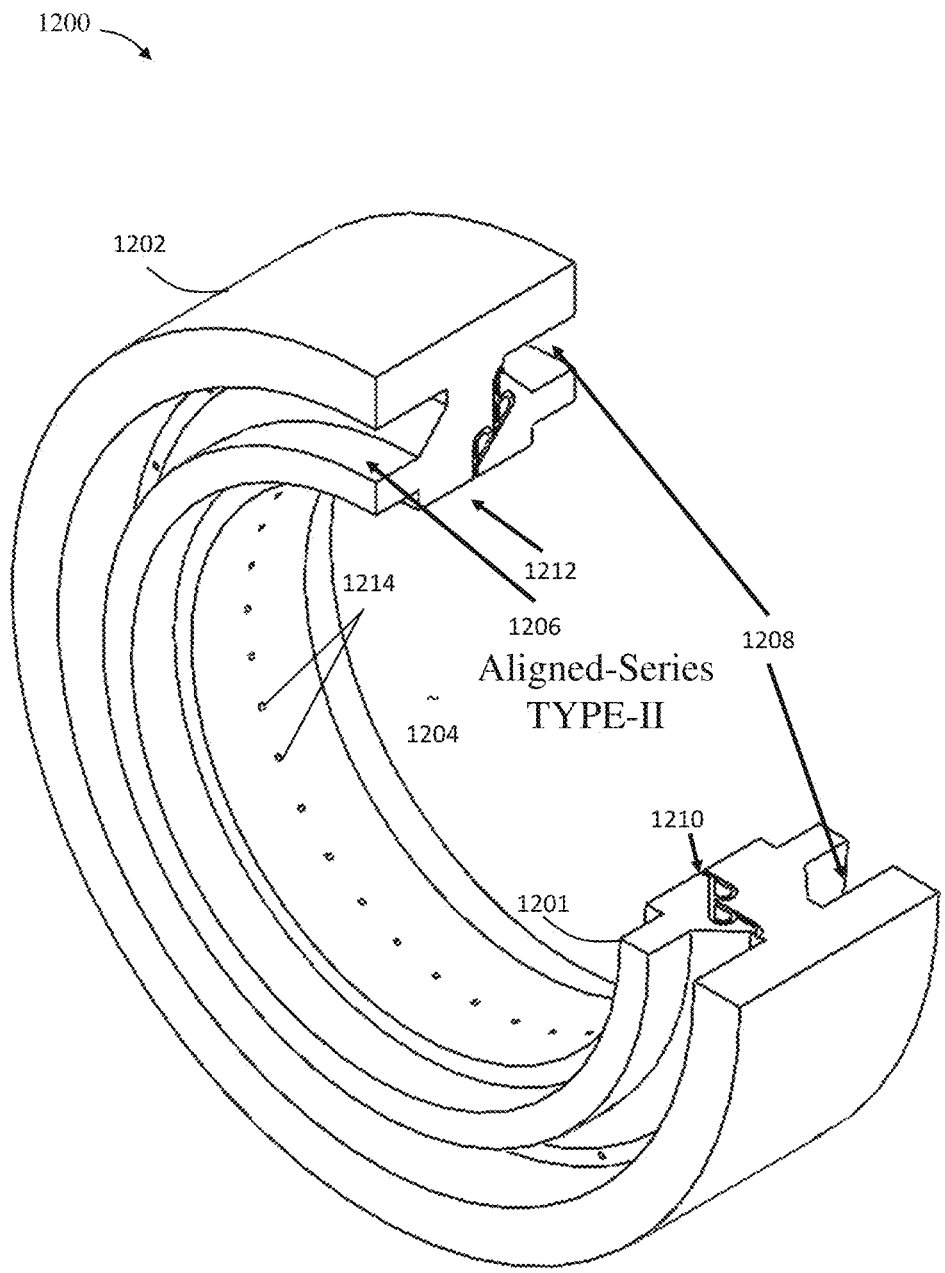
FIG. 12 is perspective view of an injector assembly wherein the port/Tesla valve configuration is aligned-series/Type II.

With further reference to FIG. 12, Type-II (see FIG. 3B) is shown in an aligned-series configuration (see FIG. 4C). In this configuration, an example of an injector assembly 1200 is shown which includes an inner cylindrical body 1201 and an outer cylindrical body 1202, the space within the cylindrical body 1201 forming a cylindrical annulus 1204, that provides the combustion chamber. The space between the inner cylindrical body 1201 and the outer cylindrical body 1202 forms two separated regions forming a fuel injection manifold 1206 and an oxidizer injection manifold 1208, each in the form of a cylindrical annulus, although interchangeable. The space within the inner cylindrical body 1201 forms the combustion chamber 1204, within which detonation occurs. Each of the two manifolds fluidly communicates with the combustion chamber via a plurality of Tesla valves. In FIG. 12, one set of such Tesla valves 1210 and 1212 are shown, however, it should be appreciated a large number of the valves are disposed circumferentially about the two annuluses, each valve terminating into the combustion chamber 1204 via a port 1214 that are aligned and provided in series. Tesla valves 1210 are responsible for fluid communication between the fuel injection manifold 1206 and the combustion chamber 1204, while Tesla valves 1212 are responsible for fluid communication between the oxidizer injection manifold 1208 and the combustion chamber 1204. Thus, the Tesla valves 1210 and 1212 are positioned in an aligned-series configuration with respect to one-another bringing fuel and the oxidizer agent for combustion into the combustion chamber 1204.

Figure 13:
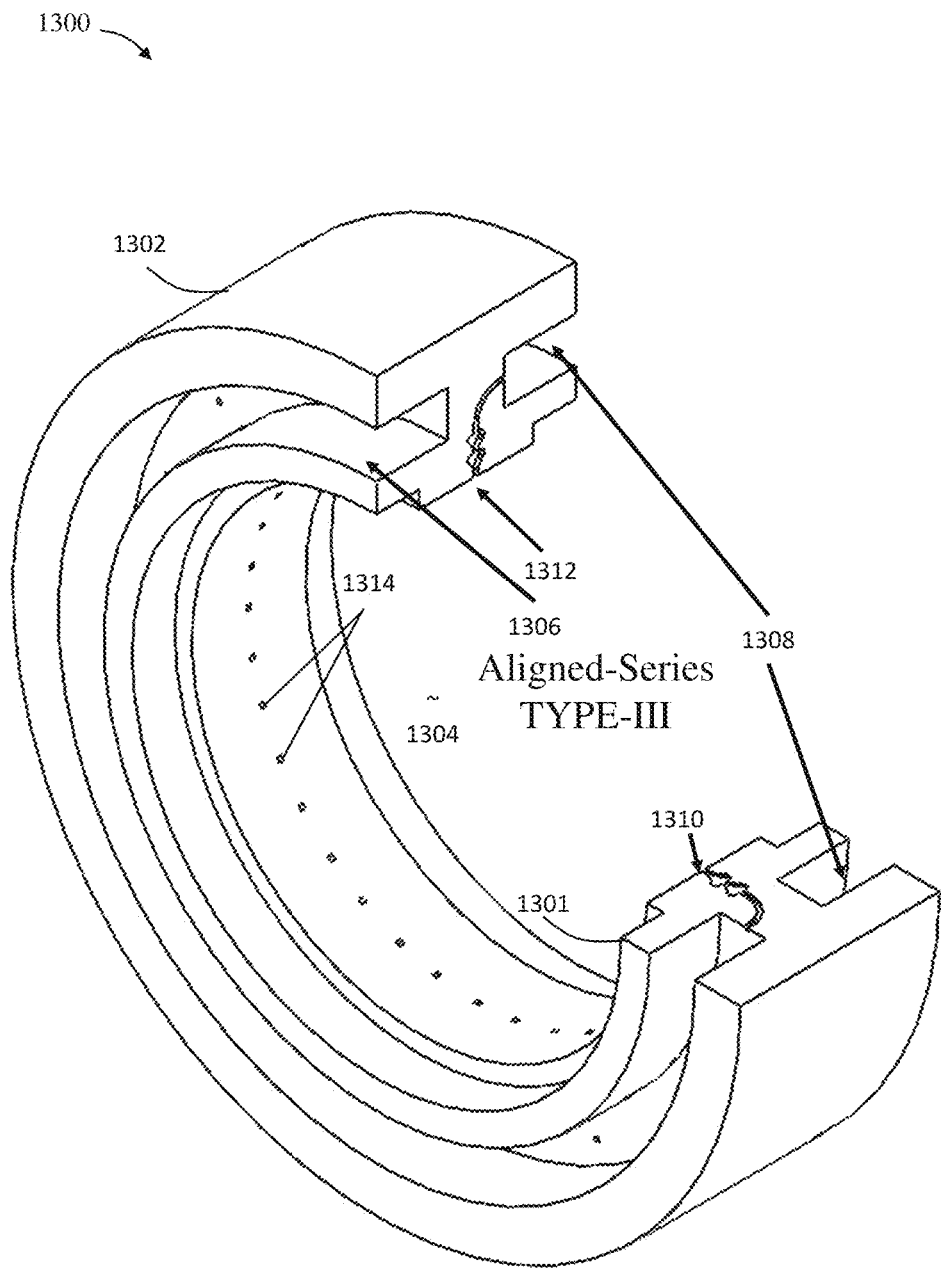
FIG. 13 is perspective view of an injector assembly wherein the port/Tesla valve configuration is aligned-series/Type III.

With further reference to FIG. 13, Type-II (see FIG. 3B) is shown in an aligned-series configuration (see FIG. 4C). In this configuration, an example of an injector assembly 1300 is shown which includes an inner cylindrical body 1301 and an outer cylindrical body 1302, the space within the cylindrical body 1301 forming a cylindrical annulus 1304, that provides the combustion chamber. The space between the inner cylindrical body 1301 and the outer cylindrical body 1302 forms two separated regions forming a fuel injection manifold 1306 and an oxidizer injection manifold 1308, each in the form of a cylindrical annulus, although interchangeable. The space within the inner cylindrical body 1301 forms the combustion chamber 1304, within which detonation occurs. Each of the two manifolds fluidly communicates with the combustion chamber via a plurality of Tesla valves. In FIG. 13, one set of such Tesla valves 1310 and 1312 are shown, however, it should be appreciated a large number of the valves are disposed circumferentially about the two annuluses, each valve terminating into the combustion chamber 1304 via a port 1314 that are aligned and provided in series. Tesla valves 1310 are responsible for fluid communication between the fuel injection manifold 1306 and the combustion chamber 1304, while Tesla valves 1312 are responsible for fluid communication between the oxidizer injection manifold 1308 and the combustion chamber 1304. Thus, the Tesla valves 1310 and 1312 are positioned in an aligned-series configuration with respect to one-another bringing fuel and the oxidizer agent for combustion into the combustion chamber 1304.

Figure 14:
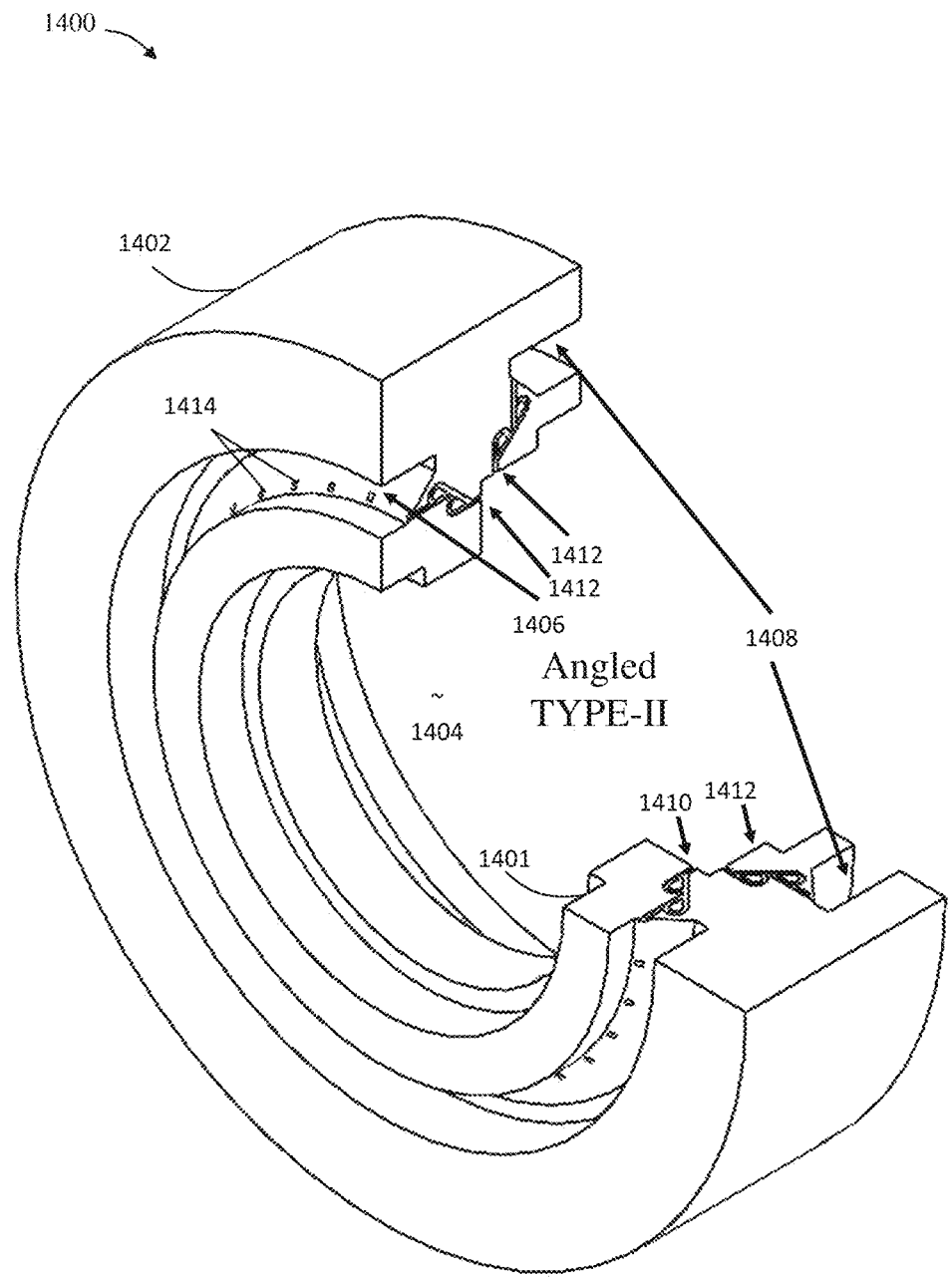
FIG. 14 is perspective view of an injector assembly wherein the port/Tesla valve configuration is angled/Type II.

With further reference to FIG. 14, Type-II (see FIG. 3B) is shown in an angled configuration. In this configuration, an example of an injector assembly 1400 is shown which includes an inner cylindrical body 1401 and an outer cylindrical body 1402, the space within the cylindrical body 1401 forming a cylindrical annulus 1404, that provides the combustion chamber. The space between the inner cylindrical body 1401 and the outer cylindrical body 1402 forms two separated regions forming a fuel injection manifold 1406 and an oxidizer injection manifold 1408, each in the form of a cylindrical annulus, although interchangeable. The space within the inner cylindrical body 1401 forms the combustion chamber 1404, within which detonation occurs. Each of the two manifolds fluidly communicates with the combustion chamber via a plurality of Tesla valves. In FIG. 14, two sets of such Tesla valves 1410 and 1412 are shown, however, it should be appreciated a large number of the valves are disposed circumferentially about the two annuluses, each valve terminating into the combustion chamber 1404 via a port 1414 (for clarity the ports 1414 are not shown on the inner surface of inner cylindrical body 1401). Tesla valves 1410 are responsible for fluid communication between the fuel injection manifold 1406 and the combustion chamber 1404, while Tesla valves 1412 are responsible for fluid communication between the oxidizer injection manifold 1408 and the combustion chamber 1404. The Tesla valves 1410 and 1412 are positioned in an angled configuration with respect to one-another bringing fuel and the oxidizer agent for combustion into the combustion chamber 1404.

Figure 15:
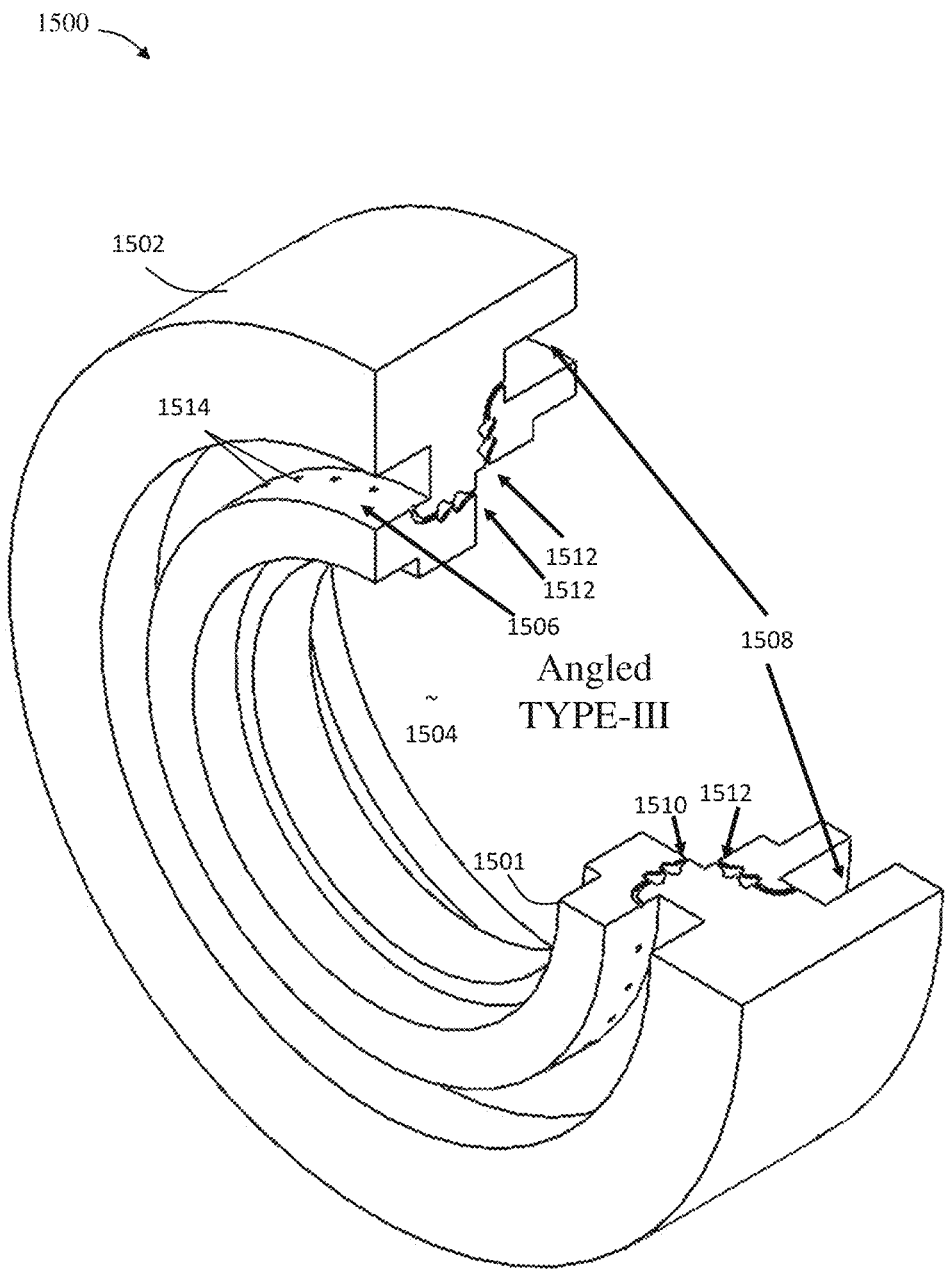
FIG. 15 is perspective view of an injector assembly wherein the port/Tesla valve configuration is angled/Type III.

With further reference to FIG. 15, Type-II (see FIG. 3B) is shown in an angled configuration. In this configuration, an example of an injector assembly 1500 is shown which includes an inner cylindrical body 1501 and an outer cylindrical body 1502, the space within the cylindrical body 1501 forming a cylindrical annulus 1504, that provides the combustion chamber. The space between the inner cylindrical body 1501 and the outer cylindrical body 1502 forms two separated regions forming a fuel injection manifold 1506 and an oxidizer injection manifold 1508, each in the form of a cylindrical annulus, although interchangeable. The space within the inner cylindrical body 1501 forms the combustion chamber 1504, within which detonation occurs. Each of the two manifolds fluidly communicates with the combustion chamber via a plurality of Tesla valves. In FIG. 15, two sets of such Tesla valves 1510 and 1512 are shown, however, it should be appreciated a large number of the valves are disposed circumferentially about the two annuluses, each valve terminating into the combustion chamber 1504 via a port 1514 (for clarity the ports 1514 are not shown on the inner surface of inner cylindrical body 1501). Tesla valves 1510 are responsible for fluid communication between the fuel injection manifold 1506 and the combustion chamber 1504, while Tesla valves 1512 are responsible for fluid communication between the oxidizer injection manifold 1508 and the combustion chamber 1504. The Tesla valves 1510 and 1512 are positioned in an angled configuration with respect to one-another bringing fuel and the oxidizer agent for combustion into the combustion chamber 1504.

Figure 16:
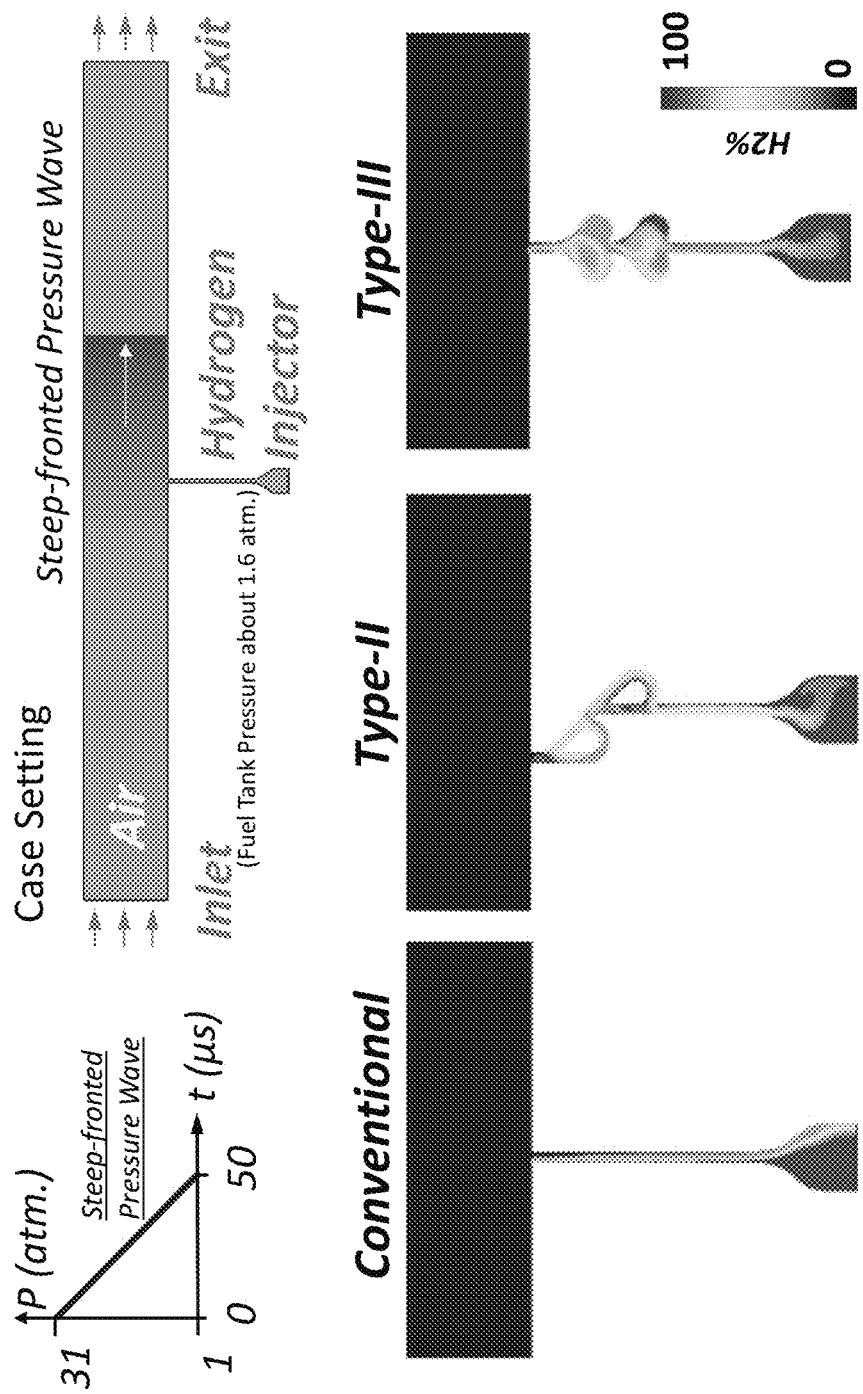
FIG. 16 is graphical representation of a simulation result showing the effectiveness of Tesla valves, according to the present disclosure.

Referring to FIG. 16, simulation results are provided to show the how the Type II and III operate in comparison to a conventional injection port. In FIG. 16, in the conventional situation, it can be easily seen the shockwave from detonation works backward from the combustion chamber back to the injection manifold. In particular, the color blue represents 0% fuel (e.g., $H_2$) while the color red represents 100% fuel. In the conventional example, the fuel is injected at the inlet where the majority of the inlet is occupied by the fuel. However, as seen a significant amount of exhaust gases in the form of blue/green/yellow makes its way back to the inlet in the form of reverse flow. According to the simulations, for a characteristic length (see FIGS. 3A, 3B, and 3C) of about 20 mm, and passage diameter of about 1 mm, the Tesla valves can prevent reverse flow for a ratio of about 5 to about 35 of pressure ($P_2/P_1$) from a second chamber (e.g., a combustion chamber) having pressure $P_2$ back to a first chamber (e.g., a fuel manifold or an oxidizer manifold) having pressure $P_1$.

In Type II and Type II configurations shown in FIG. 16, however, very little exhaust gases return to the inlet. For example, in both types (i.e., Type II and Type III), no green is seen at the inlet as the majority of the exhaust gases are self-impinged at the corresponding Tesla valves.

Thus, FIG. 16 provides evidence of operational theory of the Tesla valves discussed herein.

Those having ordinary skill in the art will recognize that numerous modifications can be made to the specific implementations described above. The implementations should not be limited to the particular limitations described. Other implementations may be possible.

The invention claimed is:

1. A rotating detonation engine (RDE), comprising:
a housing,
an injector assembly disposed within the housing, the injector assembly, comprising
a fuel manifold,
an oxidizer manifold, and
a combustion chamber, wherein fuel from the fuel manifold and an oxidizer from the oxidizer manifold are combined and combusted in the combustion chamber, and
wherein each of the fuel and oxidizer manifolds communicates with the combustion chamber via a plurality of dedicated radially disposed Tesla valves around the combustion chamber each via a corresponding port with only one Tesla valve between the fuel manifold and the corresponding port on the combustion chamber and with only one Tesla valve between the oxidizer manifold and the corresponding port on the combustion chamber, wherein the plurality of Tesla valves substantially eliminate reverse flow of exhaust gases from the combustion chamber back to the fuel manifold or the oxidizer manifold.

2. The RDE of claim 1, wherein the plurality of Tesla valve includes shapes of looped-shaped terminated with elongated ends.

3. The RDE of claim 2, wherein the plurality of Tesla valves are disposed based on parallel-aligned wherein fuel and oxidizer ports form parallel and aligned outlets.

4. The RDE of claim 3, wherein the plurality of Tesla valves are angled wherein the plurality of tesla valve are divided into pairs of Tesla Valves that are disposed at about 90°.

5. The RDE of claim 4, wherein the injector assembly is manufactured by additive manufacturing.

6. The RDE of claim 5, wherein the material used for the injector assembly includes material selected from the group consisting of nanopowders of stainless steel, INCONEL®, titanium alloys, and ceramics.

7. The RDE of claim 1, wherein the injector assembly further comprises:
an inner cylindrical body space within which forming a combustion chamber, and
an outer cylindrical body, wherein the space between the outer cylindrical body and the inner cylindrical body forming a cylindrical annulus.

8. The RDE of claim 7, wherein the cylindrical annulus forms i) the fuel manifold, and
ii) the oxidizer manifold separated from the fuel manifold.

9. The RDE of claim 8, wherein each of the Tesla valves terminate to a corresponding port disposed on an inner surface of the inner cylindrical body.

10. The RDE of claim 1, wherein when the plurality of Tesla valves have a characteristic length of about 20 mm having a passage diameter of about 1 mm, reverse flow is prevented when pressure ratio between the combustion chamber and either of the fuel manifold or oxidizer manifold are between about 5 and 35.

11. A reverse flow prevention arrangement, consisting of:
a first chamber;
a second chamber; and
a plurality of dedicated Tesla valves disposed between the first chamber and the second chamber each terminating at a port radially disposed around the second chamber, each dedicated Tesla valve having an inlet coupled to the first chamber and an outlet coupled to the second chamber via its corresponding port without any moving parts such that forward flow from the first chamber to the second chamber is allowed by the plurality of Tesla valves but reverse flow is prevented from the second chamber to the first chamber.

12. The reverse flow prevention arrangement of claim 11, wherein the first chamber is one of a fuel manifold or an oxidizer manifold, and the second chamber is a combustion chamber, wherein fuel from the fuel manifold and an oxidizer from the oxidizer manifold are combined and combusted in the combustion chamber.

13. The reverse flow prevention arrangement of claim 11, wherein the plurality of Tesla valve includes shapes selected from the group consisting of looped-shaped terminated with elongated ends, an offset figure-8 shaped conduit terminated with elongated ends, a double spade-shaped conduit terminated with elongated ends, and a combination thereof.

14. The reverse flow prevention arrangement of claim 13, wherein the plurality of Tesla valves are disposed based on a disposition selected from the group consisting of parallel-aligned wherein the ports form parallel and aligned outlets, parallel-misaligned wherein the ports form parallel outlets where the alternating fuel and oxidizer ports are misaligned, aligned-series wherein the ports form outlets of alternating fuel and oxidizer ports, angled where the fuel and oxidizer ports are disposed at an angle with respect to one-another, and a combination thereof.

15. The reverse flow prevention arrangement of claim 14, wherein the angled Tesla valves are disposed at about 90°.

16. The reverse flow prevention arrangement of claim 15, wherein the plurality of Tesla valves are manufactured by additive manufacturing.

17. The reverse flow prevention arrangement of claim 16, wherein the material used for the plurality of Tesla valves includes material selected from the group consisting of nanopowders of stainless steel, INCONEL®, titanium alloys, and ceramics.

18. The reverse flow prevention arrangement of claim 11, wherein when the plurality of Tesla valves have a characteristic length of about 20 mm having a passage diameter of about 1 mm, reverse flow is prevented when pressure ratio between the second chamber and the first chamber is between about 5 and 35.

\* \* \* \* \*